United States Patent [19]
Okamoto

[11] Patent Number: 6,052,349
[45] Date of Patent: Apr. 18, 2000

[54] WAVEFORM EQUALIZER AND MEMORY DEVICE HAVING A WAVEFORM EQUALIZER

[75] Inventor: Yutaka Okamoto, Tokyo, Japan

[73] Assignee: Kabushiki Kaisha Toshiba, Kawasaki, Japan

[21] Appl. No.: 08/939,758

[22] Filed: Sep. 29, 1997

[30] Foreign Application Priority Data

Sep. 30, 1996 [JP] Japan .................................. 8-259866

[51] Int. Cl.[7] ............................................. G11B 7/00
[52] U.S. Cl. .................................................. 369/59
[58] Field of Search ........................... 369/124, 59, 58, 369/47, 48, 32

[56] References Cited

PUBLICATIONS

Nair et al: "Nonlinear Equalization for Data Storage Channels", IEEE Int'l Conf.Comm: May 1994, pp. 250–254.

Nair et al: "Sinplified Nonlinear Equalizers", IEEE Transactions On Magnetics, vol. 31, No. 6, Nov. 1995, pp. 3051–3053.

*Primary Examiner*—Nabil Hindi
*Attorney, Agent, or Firm*—Pillsbury Madison & Sutro LLP

[57] ABSTRACT

A waveform equalizer comprises a preamplifier for amplifying the reproduced signal read out of a disk by means of an optical pick-up and the reproduced signal is converted into a digital signal by means of an A/D converter adapted to carrying out sampling operations with the data clock cycle. The reproduced signal waveform of the digital signal is subjected to a waveform equalizing process so as to minimize the mean square error relative to the amplitude of the target equalization waveform by means of linear operations. Additionally, the sample values of the reproduced signal waveform that is linearly equalized are nonlinearly equalized by neural network type operations.

14 Claims, 11 Drawing Sheets

WAVEFORM EQUALIZER AND MEMORY DEVICE HAVING A WAVEFORM EQUALIZER

BACKGROUND OF THE INVENTION

The present invention relates to a waveform equalizer for use in a memory device for storing and reproducing data optically, magnetically or magneto-optically. More particularly, it relates to a waveform equalizer that can effectively eliminate the adverse effects of linear and non-linear distortions.

The entire contents of Japanese Patent Application No. 8-259866 filed on Sep. 30, 1996 are incorporated herein for reference.

Conventional memory devices include optical disk devices, magnetic disk devices and magneto-optical disk devices. An optical disk device stores and reproduces data optically. A magnetic disk device stores and reproduces data magnetically. A magneto-optical disk device stores and reproduces data magneto-optically. These devices each comprise a reading head (a magnetic head or an optical pickup), a preamplifier, a waveform equalizer, a data detection circuit, and a decoder.

Each of these devices reproduce data in the following way. The reading head reads data signals from a disk. The pre-amplifier amplifies the data signals. The waveform equalizer equalizes the waveform of each data signal. The detection circuit detects binary data from the data signals whose waveforms have been equalized. The decoder decodes the binary data.

In recent years, a signal processing technique, generally known as PRML (Partial Response Maximum Likelihood) has come into use, for reproducing data signals which are recorded on a disk in high density. PRML is a technique for detecting data on the basis of the correlation of the waveforms of data signals sampled at discrete sampling points, at either the input of the waveform equalizer or the input of the data detection circuit (viterbi decoder). More precisely, the amplitude of each signal read from the disk is quantized by an A/D converter, providing a digital data item. The digital data item is subsequently processed.

The waveform equalizer is used to eliminate the distortions in the waveform of a data signal. The distortions are attributable to the characteristics of the system (particular, the recording channel) which has recorded the data on the disk. Hence, the waveform equalizer reduces the ratio of data-detection error to a value which falls within an allowable range. Known waveform equalizers each have an analog filter. Recently, an adaptive digital filter is used more often, in place of the analog filter, as data signals are now processed in the form of digital data. The adaptive digital filter renders the equalizer more adaptable to changes in the characteristics of the recording channel. (The characteristics of the recording channel depend on the recording site, e.g., track position, and on other factors.) The fundamental function of a waveform equalizer is to convert a recording/reproducing channel to a linear model and to eliminate linear distortions in the waveform of a data reproduced signal.

There has been an increasing demand for memory devices having a large memory capacity. A high recording density of several giga bits per square inch has been achieved for hard disk devices to meet the demand. However, with such a high data recording density, it is impossible to provide a linear model for the binary data recorded on the disk due to the inadequate response characteristic of the recording channel. Thus, it is still necessary to take into consideration nonlinear factors of binary data. With known linear waveform equalizers, the residual equalization errors increase when the ratio of the nonlinear distortions increases in the waveform of the reproduced signal. Consequently, it is difficult to maintain the error ratio of the detected data within an allowable range.

It will be described in detail how linear distortions and nonlinear distortions are equalized.

In a conventional disk device, the system comprising a set of a recording medium, a recording/reproducing head and other components can be regarded as a recording channel. The reproduced and isolated response waveform that corresponds to "1" of the binary data to be recorded can be assumed to be constant and remain unchanged regardless of the recording pattern. Therefore, the reproduced waveform that corresponds to the recorded binary data can be obtained by convolution of the isolated response waveform and a binary data pattern.

Since a recording channel has only a limited frequency responsiveness, an isolated response waveform has broad outskirts with a limited frequency band. The broad outskirts interferes with those of the waveforms of adjacent bits that correspond to the recorded data pattern. This gives rise to distorted waveforms. A waveform equalizer is a circuit which eliminates the interference of waveforms, thereby compensating the degraded band of the recording channel and restoring a waveform free from distortions. The waveform equalizer incorporated in a partial response type read channel reduces the waveform interference to a level that is permissible in a PR-class waveform equalizer.

The transfer characteristic of a waveform equalizer can be determined by performing linear computational operations on the response waveform of the recording channel and an ideal waveform to be applied to the detector. This known process of equalizing the distortions in the waveform of a reproduced signal, generated by the interference of waveforms that occurs when isolated waveforms are superposed will be referred to as a linear waveform equalizing process.

In the case of high-density recording of several giga bits per square inch, the nonlinear distortions are remarkable because they are inherent in systems comprising a recording medium and a recording/reproducing head. Therefore, the assumption that the reproduced and isolated response waveform is constant and remains unchanged regardless of the recording pattern does not remain true. The reproduced signal waveform is more distorted due to the shifts of the waveform, the peak position jitter and pulse width variation, all dependent on the recording pattern and unable to be determined by linear computational operations. Hence, the distortions that occur due to these factors cannot be eliminated by a known waveform equalizer. They can be eliminated only by means of a waveform treating process designed to operate in accordance with the recording pattern. A waveform equalizing process not relying upon superposing isolated single waveforms will be hereinafter referred to as a nonlinear equalizing process.

In a waveform equalizer designed to processes recorded data before the data is detected, the recorded data to be reproduced has to be selected only by presumption. Techniques of selecting recorded data consist of the use of a feedback circuit comprising a decision feedback type preliminary discriminator and the use of a learning method of combining an inter-node connection weighting factor and a threshold value determining node in a multilayer perceptron (MLP) type neural network.

However, it is difficult for a decision feedback type waveform equalizer to reproduce reliable data when the error propagation rate is high. This is because this waveform equalizer is designed to feedback a value obtained at a latter stage of the circuit. Known documents describing a nonlinear waveform equalizer having an MLP type neural network configuration (hereinafter referred to as MLP waveform equalizer) include "Nonlinear Equalization for Data Storage Channels, by Saphotharan K Nair and Jaekyun Moon, Proceedings of IEEE Int'l. Conf. Comm, New Orleans, La., USA, May 1994".

The most simple MLP type waveform equalizer has a three-layered structure. The first layer is an input layer comprising a plurality of delay elements having a delay time equal to the data clock period and connected in series. The second layer comprises a plurality of intermediate nodes. The nodes are so designed as to receive the input of the leading delay element and the outputs of the delay circuits multiplied by respective connection weights as inputs and produce as an output a value obtained by using a nonlinear function in response to the total sum of the inputs. The third layer comprises output nodes which receive the outputs of the intermediate nodes multiplied by respective connection weights as inputs and produces as an output the total sum of the inputs or a value obtained by using a nonlinear function in response to the total sum of the inputs. The connection weights used for the input layer and the nodes are determined by a technique using a backpropagation training algorithm. Known papers describing an error back propagation algorithm include "Learning internal representations by error propagation, Parallel Distributed Processing: Explorations in the Microstructure of Cognition, by Rumelhart, pp. 318–362, MIT Press, Cambridge Mass., 1986". Moon et al. "Simplified Nonlinear Equalizers, IEEE Trans. Magn., Vol. 31, No. 6, November 1995" described that the use of an MLP equalizer is effective for equalizing nonlinear distortion components.

As described earlier, the nonlinear components of the distortions contained in a reproduced signal waveform are too large to neglect, when data is reproduced from the recording medium which has a high recording density. Therefore, a nonlinear equalization process of removing the nonlinear components of the distortions is now increasingly important. Nonetheless, it still remains necessary and important to equalize the linear components of the distortions.

In view of the ever increasing recording density, it is necessary to equalize all components of the distortions of a reproduced signal waveform, both linear and nonlinear, in a data reproducing operation. While an MLP waveform equalizer provides a reliable method of equalizing linear components, using a learning effect, known linear waveform equalizers are more effective and efficient in terms of equalizing linear components and their simple circuit configuration. In fact, when a reproduced signal waveform having both linear components and nonlinear components is equalized by a three-layered MLP waveform equalizer, the nonlinear aspect of the effect of the circuit is by far unsatisfactory as will be described below.

Figure 1A:
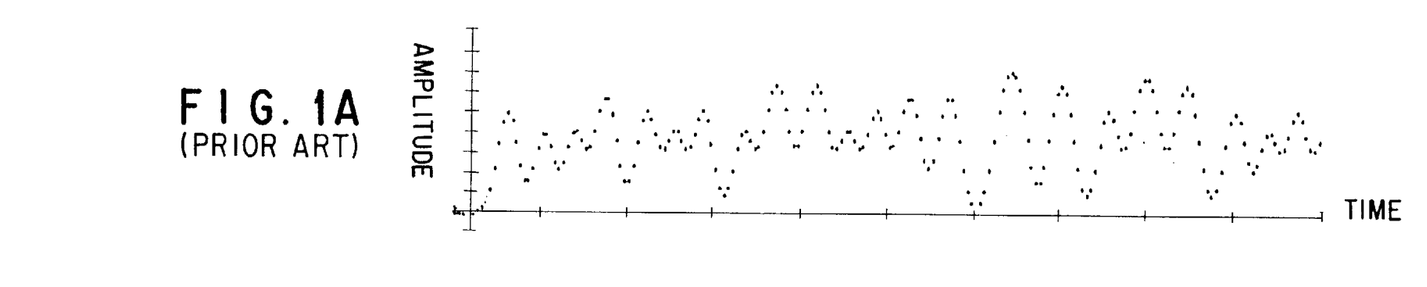
FIGS. 1A and 1B show respectively a reproduced signal waveform containing no nonlinear components of distortions and a waveform obtained by compressing it along the time base.
Figure 1B:
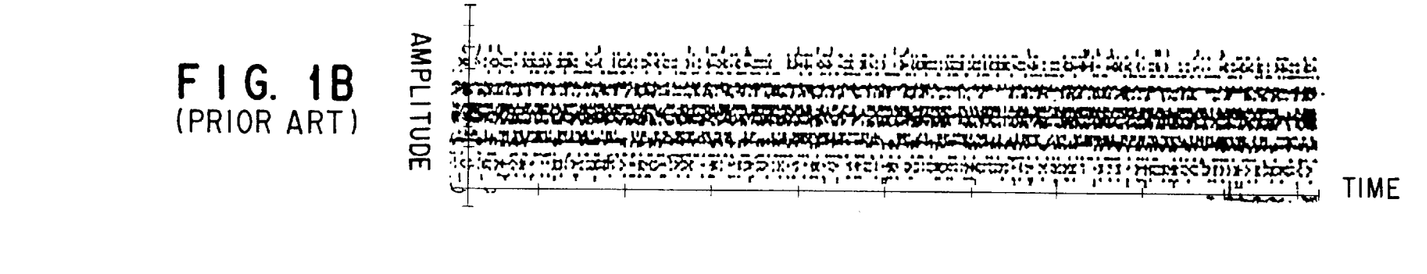
Figure 2A:
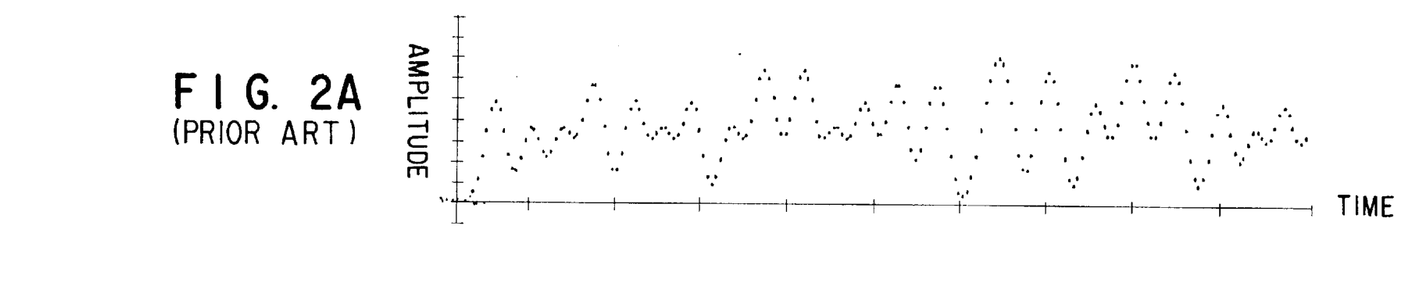
FIGS. 2A and 2B show respectively a reproduced signal waveform containing nonlinear components of distortions and a waveform obtained by compressing it along the time base.
Figure 2B:
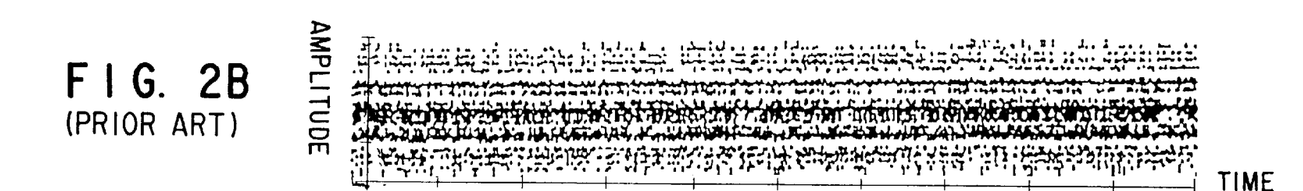
Figure 3:
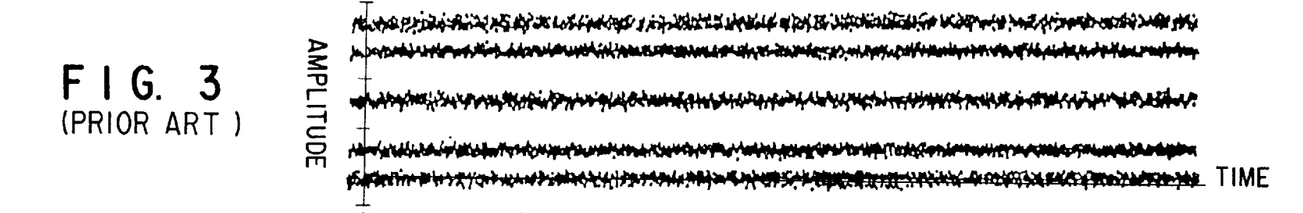
FIG. 3 is a graph obtained by equalizing the waveform of FIG. 1B to a PR1221 type waveform by means of a 30-tap FIR type linear equalizer.
Figure 5A:
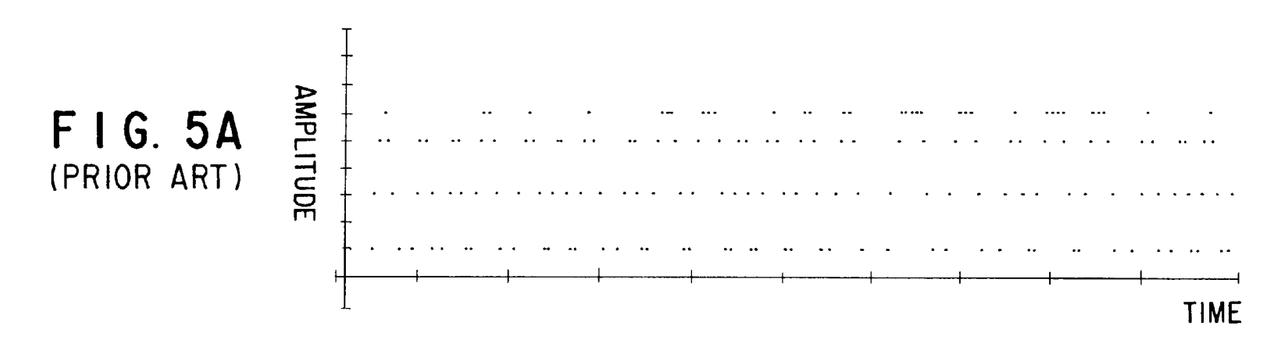
FIGS. 5A and 5B illustrate a signal equalized to show an ideal PR1221 waveform in two different formats.
Figure 5B:
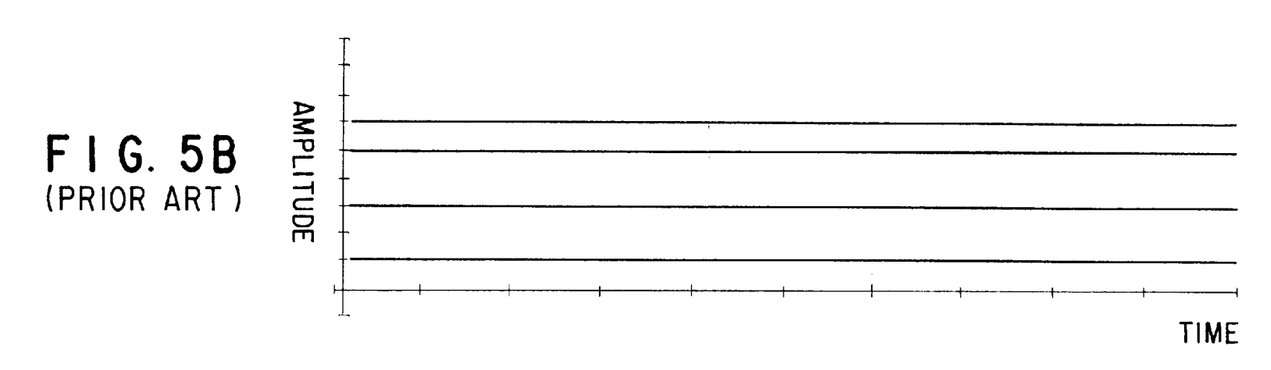

FIGS. 1A through 5B illustrate the results of linear and nonlinear equalizing operations, obtained by simulation. FIG. 1A shows the waveform of an input signal reproduced from an optical disk storing signals which are modulated in the form of (2, 7) RLL codes and which are recorded by an NRZI (non-return-to-zero-inverted recording) system in a high density. The waveform is a synthesized one that contains no nonlinear components of distortions. FIG. 1B shows the waveform of FIG. 1A which is compressed along the time axis. FIGS. 2A and 2B shows the waveform of a signal reproduced from the same optical disk having a high recording density but containing nonlinear components of distortions. FIG. 3 shows a PR1221 type waveform obtained by equalizing the waveform of FIG. 1B by means of a 30-tap FIR type linear equalizer, the waveform containing no nonlinear components of distortions. PR1221 refers to an equalization method used for PR (partial response) signal processing operations in order to obtain a value of "0, 1, 2, 2, 1, 0" for an isolated response waveform. FIGS. 5A and 5B illustrate a signal equalized to show an ideal PR1221 waveform in two different formats.

Figure 4A:
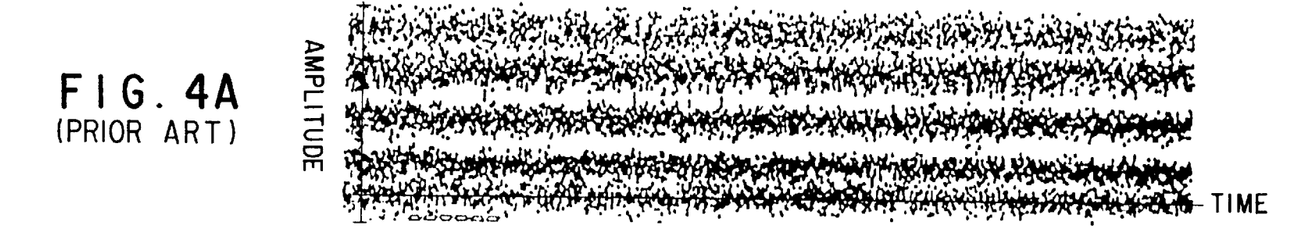
FIGS. 4A and 4B show respectively a graph obtained by equalizing the waveform of FIG. 2B to a PR1221 type waveform also by means of a 30-tap FIR type linear equalizer and a graph obtained by equalizing the waveform of FIG. 2B by means of an MLP waveform equalizer.
Figure 4B:
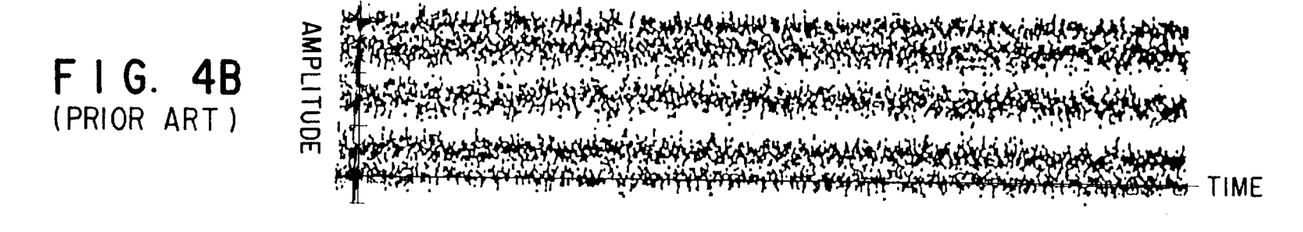

FIG. 4A is a graph obtained by equalizing the waveform FIG. 2B to a PR1221 type waveform also by means of a 30-tap FIR type linear equalizer, the waveform containing nonlinear components of distortions. It will be seen that the nonlinear components of distortions are remarkably reflected as equalization errors. FIG. 4B is a graph obtained by equalizing the waveform of FIG. 2B by an MLP waveform equalizer. This waveform contains nonlinear components of distortions. The difference between the two waveforms is seen from the graphs. Nonetheless, the result of mean square error calculations clearly indicates that the waveform of FIG. 4B obtained by an MLP waveform equalizer is more free from equalization errors than the waveform of FIG. 4A obtained by means of an FIR type linear waveform equalizer, though the nonlinear equalization effect of an MLP waveform equalizer is not so much exploited than in the waveform of FIG. 3.

From the above, it will be understood that the learning effect of a neural network does not work so as well for an MLP waveform equalizer as it does for equalizing nonlinear distortions, when the super-position of linear adjacent waveforms and nonlinear components of distortions provide compounded factors hindering an ideal equalization target from being achieved, though the MLP waveform equalizer has a proven effect on equalizing nonlinear distortions.

BRIEF SUMMARY OF THE INVENTION

The object of the present invention is to provide a waveform equalizer which can reliably perform linear processing operations on a reproduced signal waveform containing both linear components and nonlinear components of distortions and which can reduce the error ratio of the detected data to a value falling within an allowable level, by eliminating the adverse effect of the nonlinear components of distortions. Another object of the present invention is to provide a memory device incorporating such a waveform equalizer.

According to a first aspect of the invention, there is provided a disk storage device for detecting data out of a reproduced signal read from a disk and decoding the data, the device comprising: A/D conversion means for sampling a waveform of the reproduced signal at a predetermined clock cycle and converting the reproduced signal into a digital signal; linear equalization means for carrying out a linear waveform equalizing operation on the digital signal converted by the A/D conversion means in order to lessen a mean square error between the digital signal and an amplitude of an equalization target waveform; and nonlinear equalization means for carrying out a neural network type nonlinear waveform equalizing operation on sampled values of a waveform of the digital signal linearly equalized by the linear equalization means.

According to a second aspect of the invention, there is provided a waveform equalizer adapted to a memory device for detecting data out of a reproduced signal read from a disk and decoding the data, the waveform equalizer equalizing a digital signal waveform corresponding to the reproduced signal waveform into a waveform optimally adapted to a data detecting operation, the waveform equalizer comprising: linear equalization means for carrying out a linear waveform equalizing operation on the digital signal waveform to lessen a mean square error relative to an amplitude of an equalization target waveform; and nonlinear equalization means for carrying out a neural network type nonlinear waveform equalizing operation on sampled values of the waveform of the digital signal linearly equalized by the linear equalization means.

According to the invention, a disk storage device such as an optical disk device can effectively carry out a linear equalizing operation and, at the same time, a nonlinear equalizing operation of eliminating the adverse effect of nonlinear components of distortions by means of a neural network type nonlinear waveform equalizer on a reproduced signal waveform containing both linear components and non-linear components of distortions that are given rise to as a result of a high recording density. Consequently, data can be restored from reproduced signals with a data detection error ratio held under a permissible level if signals are recorded with a high recording density.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

The present invention will be described by referring to the accompanying drawing that illustrates a preferred embodiment of the invention.

Figure 6:
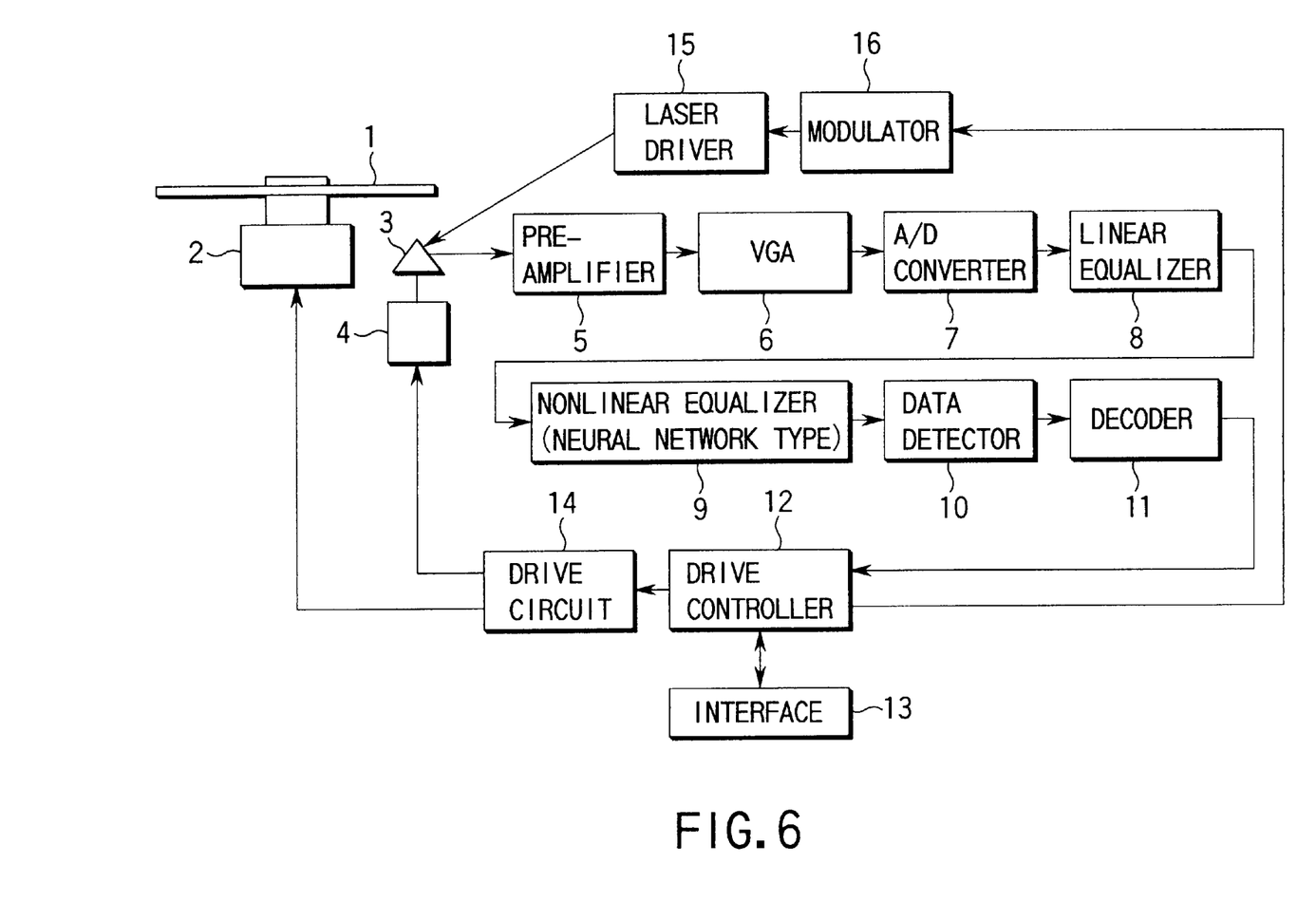
FIG. 6 is a schematic block diagram of an embodiment of optical disk device according to the invention and showing only a principal area thereof.
Figure 7:
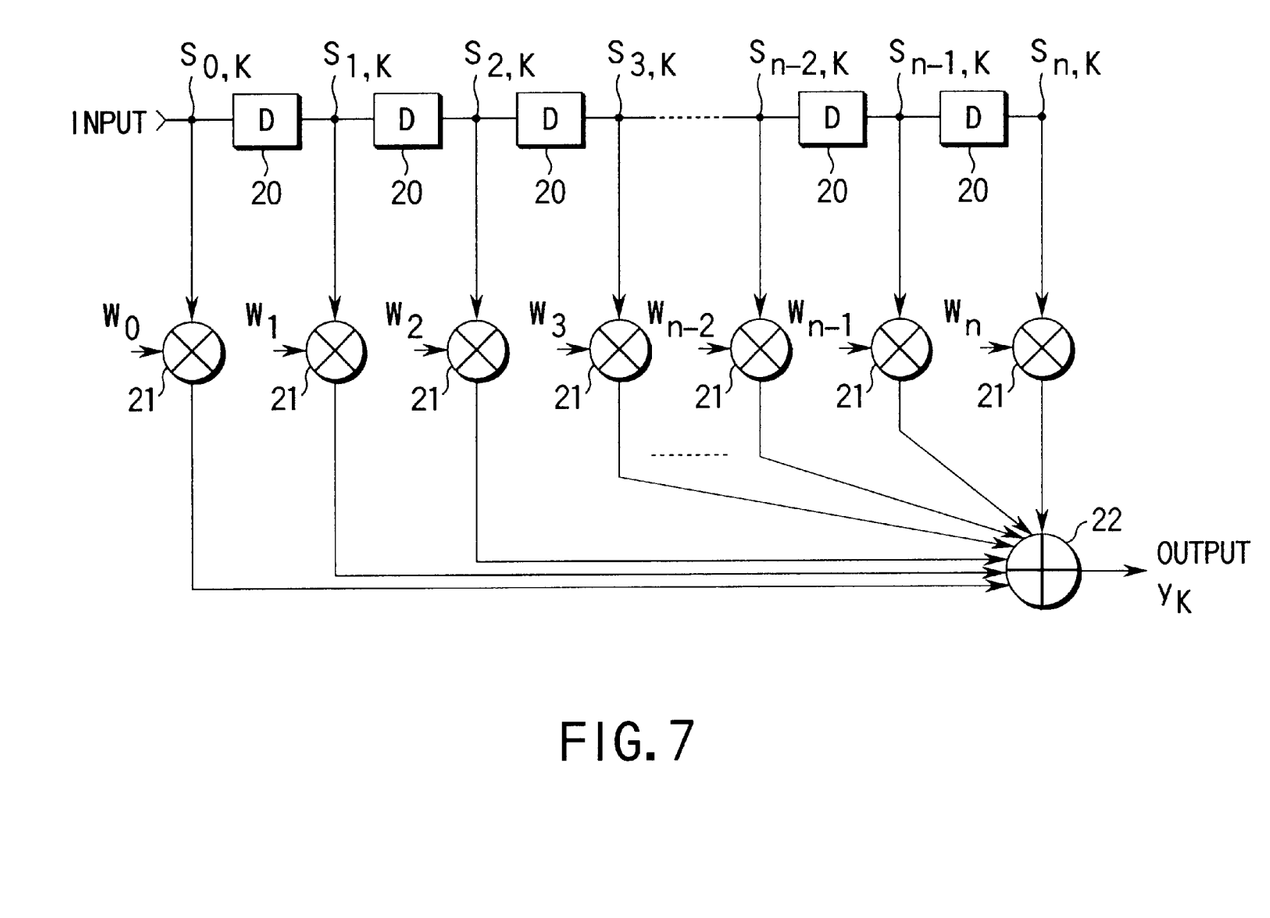
FIG. 7 is a schematic circuit diagram of the linear waveform equalizer of FIG. 6.
Figure 8:
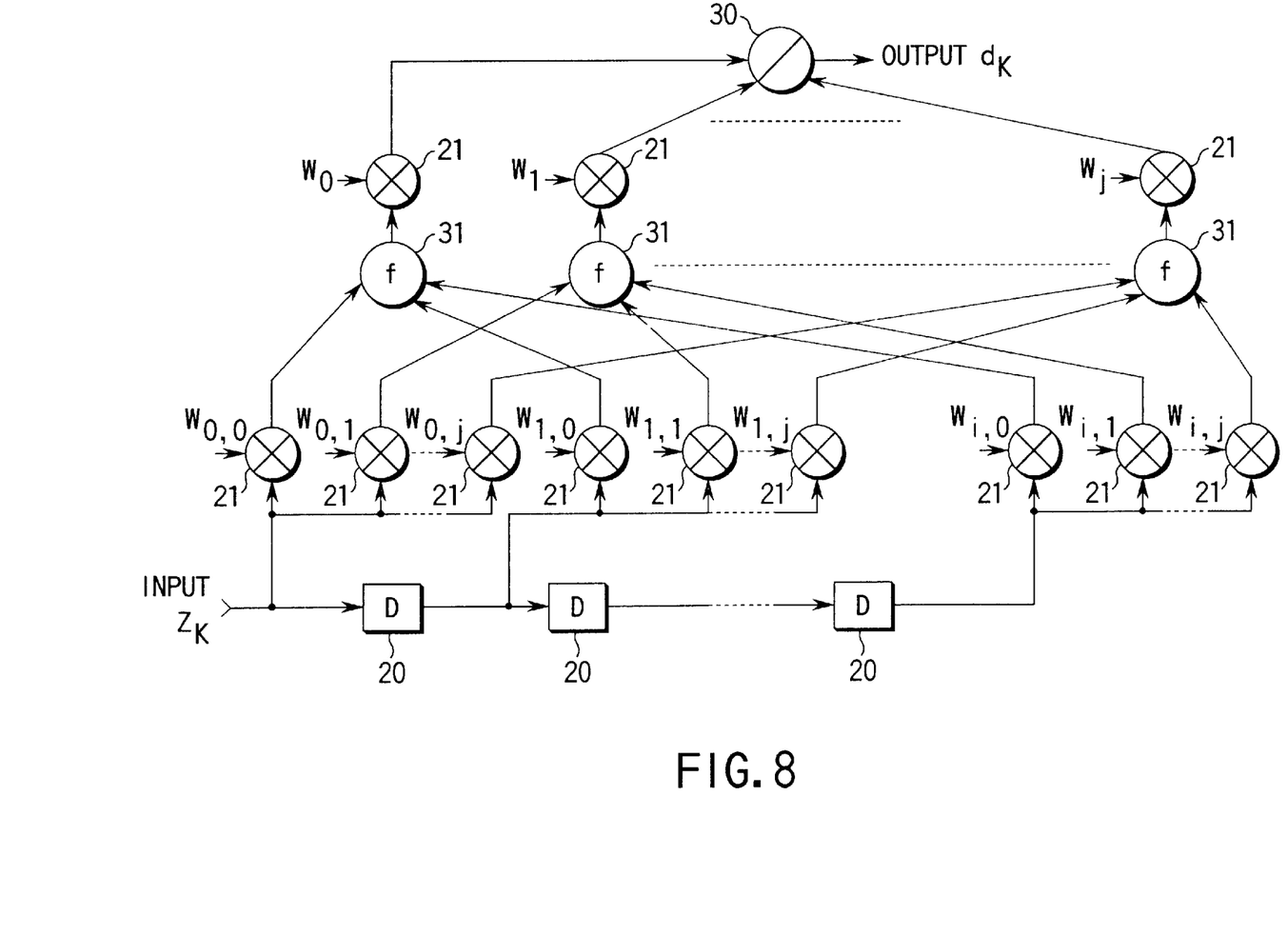
FIG. 8 is a schematic circuit diagram of the neural network type nonlinear waveform equalizer of FIG. 6.

FIG. 6 is a schematic block diagram of an embodiment of an disk device according to the invention and showing only a principal area thereof. FIG. 7 is a schematic block diagram of the linear waveform equalizer of this embodiment. FIG. 8 is a schematic block diagram of the neural network type nonlinear waveform equalizer of the embodiment.

This embodiment is an optical disk device for data recording/reproduction.

First, the configuration of the optical disk device will be described. Referring to FIG. 6, the optical disk device comprises a writable optical disk 1 as recording medium, an optical pick-up 3, a data reproducing system, a data recording system, a driver controller 12 and an interface 13. The optical disk 1 is driven to rotate by a spindle motor 2. The optical pick-up 3 is displaced by a servo motor 4 and irradiates the optical disk 1 with a laser beam to record data on and reproduce data from the latter as it is driven by a laser driver 15. The spindle motor 2 and the servo motor 4 are controlled for operation by the drive controller 12 by way of a drive control circuit 14.

The data recording system of the embodiment comprises a laser driver 15 and a modulator 16. The modulator 16 carries out a coding operation of converting recorded data transmitted from the driver controller 12 into a code bit string having a predetermined format. The laser driver 15 drives the pick-up 3 to record the coded data as marks representing the code bit string transmitted from the modulator 16.

The data reproducing system comprises a preamplifier 5, a variable gain amplifier (VGA) 6, an A/D converter 7, a linear equalizer 8, a neural network type non-linear equalizer 9, a data detector 10 and a decoder 11. The preamplifier 5 and the VGA 6 amplify the signal read and reproduced by the optical pick-up 3. The A/D converter 7 converts the reproduced and amplified signal into a digital signal representing quantized sample values at discrete time points. The linear equalizer 8 is a discrete time type linear equalizer which is a digital filter referred to as transversal filter and shown in FIG. 7. Note that the linear equalizer 8 is a continuous time type linear equalizer if the data reproducing system is an analog system that does not comprise an A/D converter 7.

The neural network type non-linear equalizer (hereinafter referred to as non-linear equalizer) 9 is an equalizer for removing the non-linear components of distortions from the linearly equalized waveform of the reproduced signal. It is a three-layered perceptron type non-linear equalizer as shown in FIG. 8. The data detector 10 is a maximum likelihood estimation type signal processing circuit for detecting data from the PR (partial response) equalized waveform of the reproduced signal. More specifically, it is a Viterbi decoder. The decoder 11 restores the original data from the code bit string detected by the data detector 10.

The drive controller 12 controls the overall operation of the optical disk device. It may be connected to a personal computer or a television set by way of the interface 13 to control the operation of transferring data for the purpose of recording and reproduction. Although not shown, the optical disk device additionally comprises a moving image compression circuit and a moving image expansion circuit necessary for recording and reproducing video data as well as an error detection/correction circuit for detecting and correcting errors in the data demodulated by a demodulation circuit 16.

Now, the linear waveform equalizer 8 will be described in greater detail.

Referring to FIG. 7, the linear waveform equalizer 8 comprises a plurality of delay circuits 20 connected in series, multipliers 21 for multiplying the input signals of the respective delay circuits 20 (sampled signal values $S_{n,k}$) by a tap factor $W_n$ (gain) and an adder 22 for adding the outputs of the multipliers 21. Each of the delay circuits 20 has a delay factor representing a data sampling period so that it delays the sampled signal value entered to it (the output of the A/D converter 7) and sends its output to the immediately succeeding delay circuit 20. Each of the multipliers 21 multiplies the input signal $S_{n,k}$ by a tap factor $W_n$ at time k and sends it to the adder 22 as output. For example, the output $S_{j,k}$ of the j-th delay circuit 20 at time k is multiplied by tap factor circuit 20 at time k is multiplied by a connection weight $W_{i,j}$ by means of the multiplier 21 and the product is sent to the j+1-th intermediate node 31. The first sampled input signal value $Z_k$ is multiplied by a connection weight $W_{0,0}$ by means of the multiplier 21 to produce one of the inputs of the 1st intermediate node 21.

The output $H_j$ of the j+1-th intermediate node 31 represents the value obtained by evaluating the sum of the inputs by means of a sigmoid function f. In other words, the following equations (2) and (3) hold true.

$$H_j=f\ (\Sigma_i W_{i,j} \cdot Z_{k-1}) \tag{2}$$

$$f(x)=(1-\exp(x))/(1+\exp(-x)) \tag{3}$$

the output of the j+1-th intermediate node 31 is multiplied by a connection weight Wj by means of the multiplier 21 to become an input of the output node 30. The output node 30 produces output dk that is the sum of the inputs at time k. The output dk is expressed by the formula (4) below.

$$dk=\Sigma_j f(\Sigma_i W_{i,j} \cdot Z_{k-i}) \tag{4}$$

The connection weight is determined by repeating a learning process according to a backpropagation training algorithm.

A small random value is selected as the initial value for all connection weights. If the expected ideal output when the k-th sampled signal value of a learning waveform sequence is entered as input is $C_k$, $W_j$ and added to the outputs of the remaining delay circuits 20 by the adder 22, which produces the sum of the outputs of all the multipliers 21 as output $Y_k$ of the linear waveform equalizer 8 at time k.

The tap factor $W_j$ is determined by means of a least mean square (LMS) algorithm as will be described below. If the j-th tap factor at time k is $S_{n,k}$ and the desired response to a sequence of sampled input signal values at time k is $C_k$, the j-th tap factor $W_{j,k+1}$ at time k+1 is expressed by formula (1) below;

$$W_{j,k+1}=W_{j,k}+\mu S_{j,k}(C_k-\Sigma_j S_{j,k} \cdot W_{j,k}) \tag{1}$$

where $\mu$ is a step-size parameter. The tap factor can be made to converge by using a sufficiently large number of iterations.

Now, the non-linear waveform equalizer 9 will be described in greater detail.

Referring to FIG. 8, the non-linear waveform equalizer 9 has a three-layered perceptron type neural network type comprising a plurality of delay circuits 20 connected in series, multipliers 21, intermediate nodes 31 and output nodes 30.

The sampled input signal value $Z_k$ that is the output of the linear waveform equalizer 8 is delayed by each of the delay circuits 20 having a delay factor representing a data sampling period and then sent to the immediately succeeding delay circuit 20. The sampled output signal value $Z_{k-i}$ of the i-th delay the error $\delta_k$ of the output at the output node 30 is expressed by formula (5) below.

$$\delta_k=C_k-dk \tag{5}$$

The error $\delta_{j,k}$ of the j+1-th intermediate node 31 under this condition is determined by formula (6) below, using back propagation;

$$\delta_{j,k}=\delta_k \cdot W_{j,k} \cdot f'(\Sigma_i W_{i,j} \cdot Z_{k-i}) \tag{6}$$

where f' is a derivative of f.

When the k-th of the learning waveform sequence is entered, all the connection weights $W_{j,k}$ and $W_{i,j,k}$ are updated in a manner as follows;

$$\delta W_{j,k}=\beta_k \cdot \delta_k \cdot f\ (\Sigma_i W_{i,j,k} \cdot Z_{k-i}) \tag{7}$$

$$\delta W_{i,j,k}=\beta_k \cdot \delta_{j,k} \cdot Z_{k-i}) \tag{8}$$

$$W_{j,k+1}=W_{j,k}+\delta W_{j,k}+\eta \delta W_{j,k-1} \tag{9}$$

$$W_{i,j,k+1}=W_{i,j,k}+\delta W_{i,j,k}+\eta \delta W_{i,j,k-1} \tag{10}$$

where $\beta_k$ represents a learning coefficient and n represents an inertial coefficient.

Now, the advantages of this embodiment will be described by referring to FIGS. 9A through 10B along with the procedures to determine a tap factor for the linear waveform equalizer 8 and a connection weight for the non-linear waveform equalizer 9.

Figure 9A:
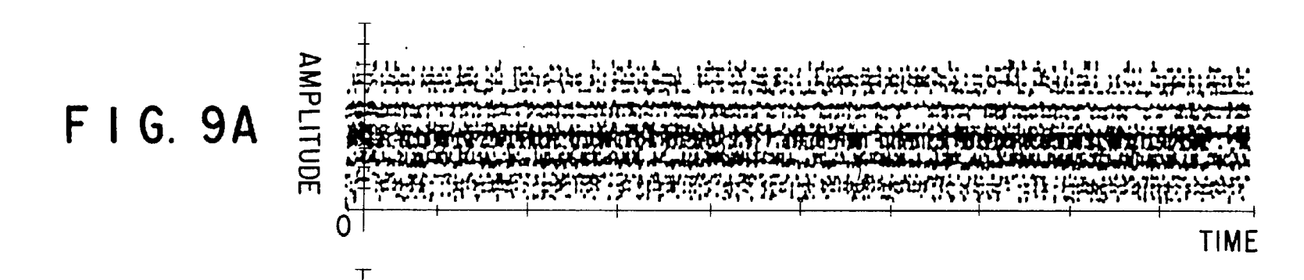
FIGS. 9A through 9E are graphs showing signal waveforms to illustrate the effect of the optical disk device of FIG. 6.
Figure 9B:
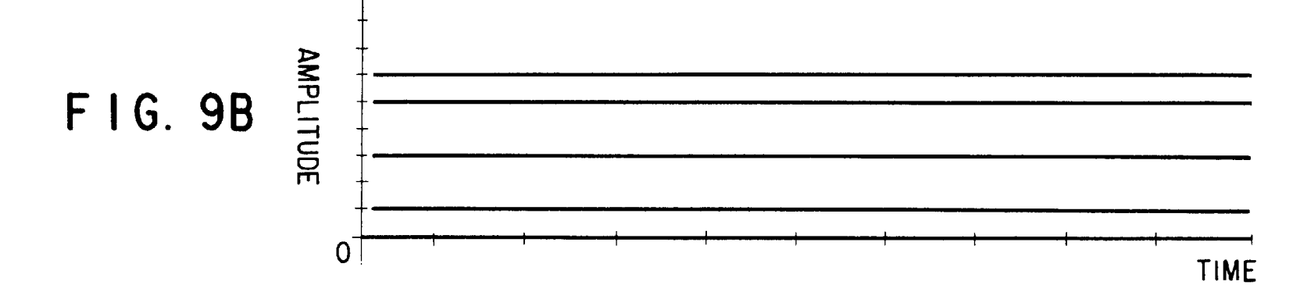

Assume firstly that the waveform of the reproduced signal read out of the optical disk 1 by means of the optical pick-up 3 contains non-linear distortion components as shown in FIG. 9A. With this embodiment, a waveform that is almost ideal as shown in FIG. 9B is produced by the linear waveform equalizer 8 and the non-linear waveform equalizer 9 due to the waveform equalization using the PR1221 method.

Figure 9C:
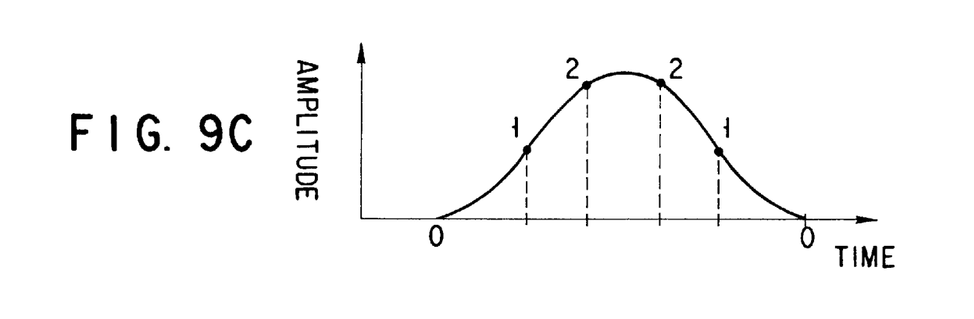

PR1221 refers to a waveform equalization method used for PR (partial response) signal processing operations in order to obtain a value of "0, 1, 2, 2, 1, 0" for the amplitude of a reproduced and isolated response wave for data "1" as shown in FIG. 9C. The waveform shown in FIG. 9C represents the response to data "1" when the data is modulated by means of (2, 7) RLL codes and stored with an NRZI system. When the response waveform values of data "1" are shown in FIG. 9C and a binary data sequence modulated by means of the (2, 7) RLL code is written in the NRZI form, only five values of 0, 1, 3, 5 and 6 are produced by superposition a sampling clock time.

Figure 9D:
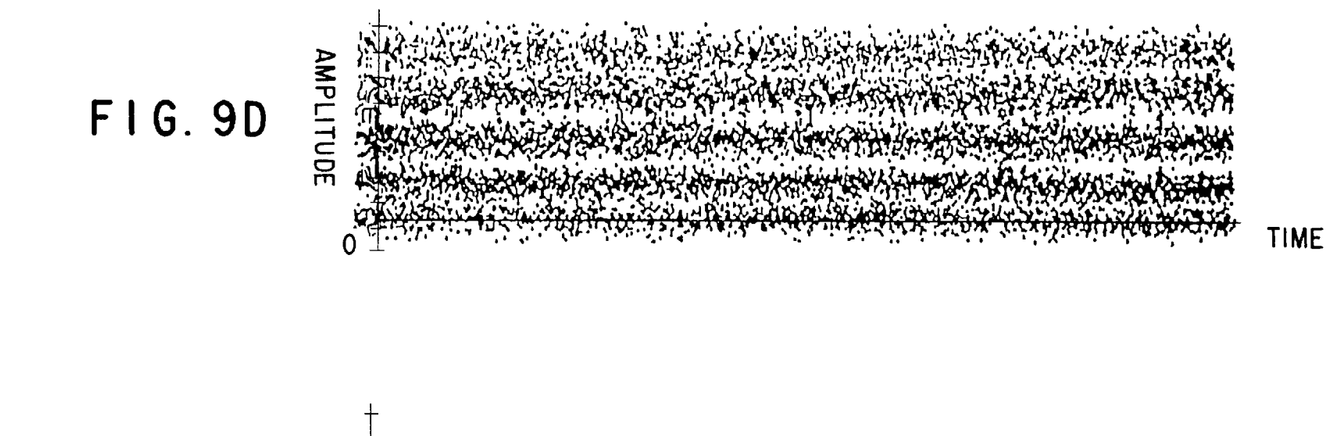
Figure 10A:
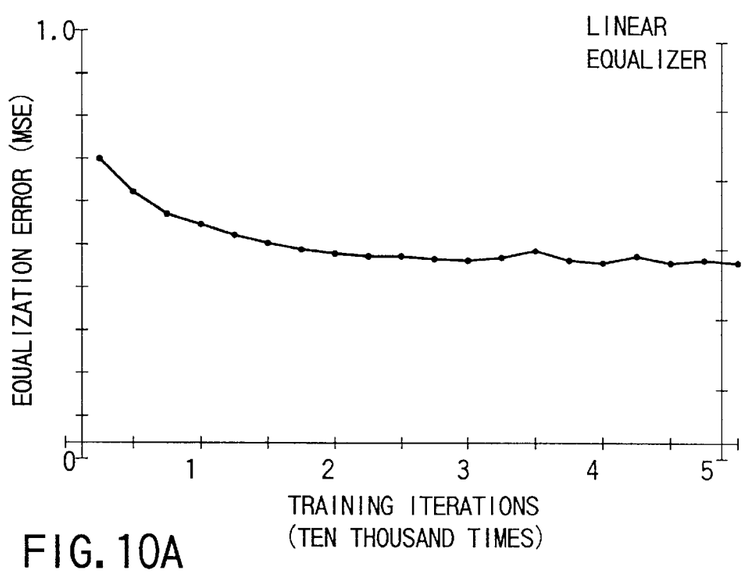
FIGS. 10A and 10B are graphs illustrating the effect of suppressing equalization errors of the optical disk device of FIG. 6.

In this embodiment, a reproduced signal waveform containing non-linear distortion components as shown in FIG. 9A is used for a sequence of sampled input signal values in order to determine the tap factor $W_n$ of the linear waveform equalizer 8. An equalized ideal waveform as shown FIG. 9B is used as a desired response sequence $C_k$ for the sequence $S_k$. In the graph of FIG. 10A, the X-axis represents the number of training iterations, whereas the Y-axis represents the mean square error (equalization error) of the output of an FIR type linear waveform equalizer with 10 taps produced by equalizing the reproduced signal waveform of FIG. 9A by means of the tap factor obtained with that number of training iterations and the desired response sequence $C_k$ shown in FIG. 9B. The scale "1.0" of the equalization error is normalized in such a way that the response 1 of the equalization waveform obtained by the PR1221 method is made equal to 1.0. FIG. 9D is a graph showing the equalizer output (the output of the linear equalizer 8 obtained after the convergence of the tap factor of the 10-tap FIR type liner equalizer. Note that the equalization error is remarkable if compared with the output waveform of the 30-tap FIR type linear equalizer illustrated in FIG. 4A.

Figure 9E:
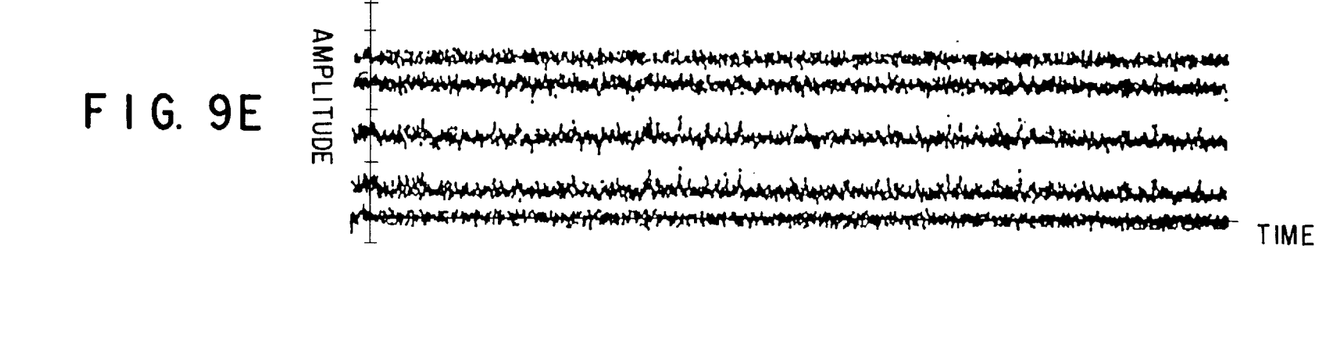
Figure 10B:
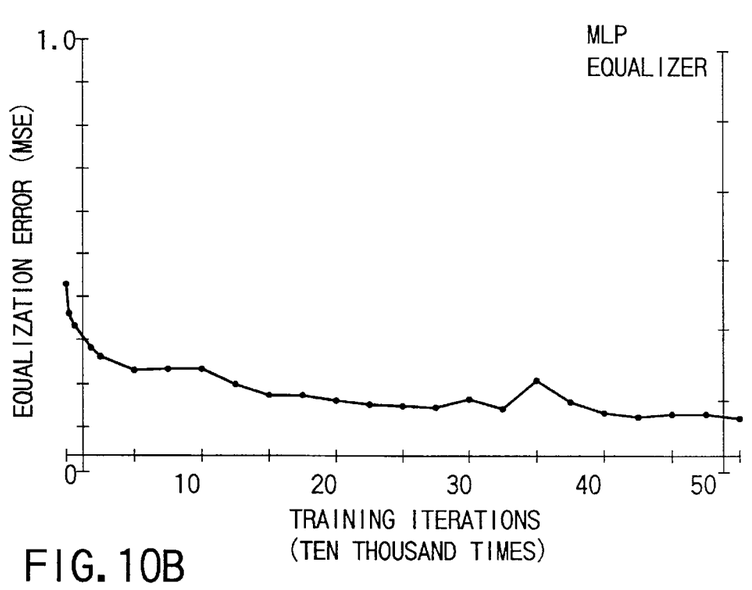

On the other hand, a signal waveform as shown in FIG. 9D that is the output of the linear equalizer 8 is used for a sequence of learning waveforms $Z_k$ in order to determine the connection weight of the nonlinear equalizer 9. Though a tap factor is determined to lessen the mean square error with the equalized ideal waveform, the signal waveform shown in FIG. 9D includes a large equalization error. An equalized ideal waveform as shown FIG. 9B is used as a desired output $C_k$ when a sequence of learning waveforms $Z_k$ are entered as in the case of the linear equalizer 8. In the graph of FIG. 10B, the X-axis represents the number of training iterations, whereas the Y-axis represents the mean square error (equalization error) of the output produced by equalizing the signal waveform of FIG. 9D by means of the connection weight obtained for the corresponding number of learning operations and the desired response sequence Ck shown in FIG. 9B. FIG. 9E is a graph showing the output of the nonlinear equalizer 9 obtained after the convergence of the connection weight. It will be seen from FIG. 9E that the nonlinear distortion components are largely removed as compared with the output waveform of linear equalizer 8 shown in FIG. 9D. The reproduced signal waveform shown in FIG. 9E is close to the equalized ideal waveform of FIG. 9B. Note that the reproduced signal waveform has been equalized to an extent almost same as the signal waveform of FIG. 3 obtained by linearly equalizing a waveform containing no nonlinear components of distortions.

As described above, if the reproduced signal waveform of the data read out of the disk 1 contains nonlinear distortion components, the embodiment carries out both a linearly equalizing operation optimal for data detection and a non-linearly equalizing operation for removing nonlinear distortion components by means of a composite equalizer comprising a linear equalizer 8 and a nonlinear equalizer 9. In other words, the embodiment provides satisfactorily both linear and nonlinear equalization effects for a reproduced signal waveform containing distortion components that require both linear and nonlinear equalizing operations if compared with a case where only a nonlinear equalizer 9 is used. Since the embodiment can effectively eliminate the nonlinear distortion components from the reproduced signal waveform of the data read out of the disk 1 containing data at a high recording density in order to maintain the data detection error ratio below a permissible level.

Next, a first possible modification that can be made to the above embodiment will be described.

Figure 11:
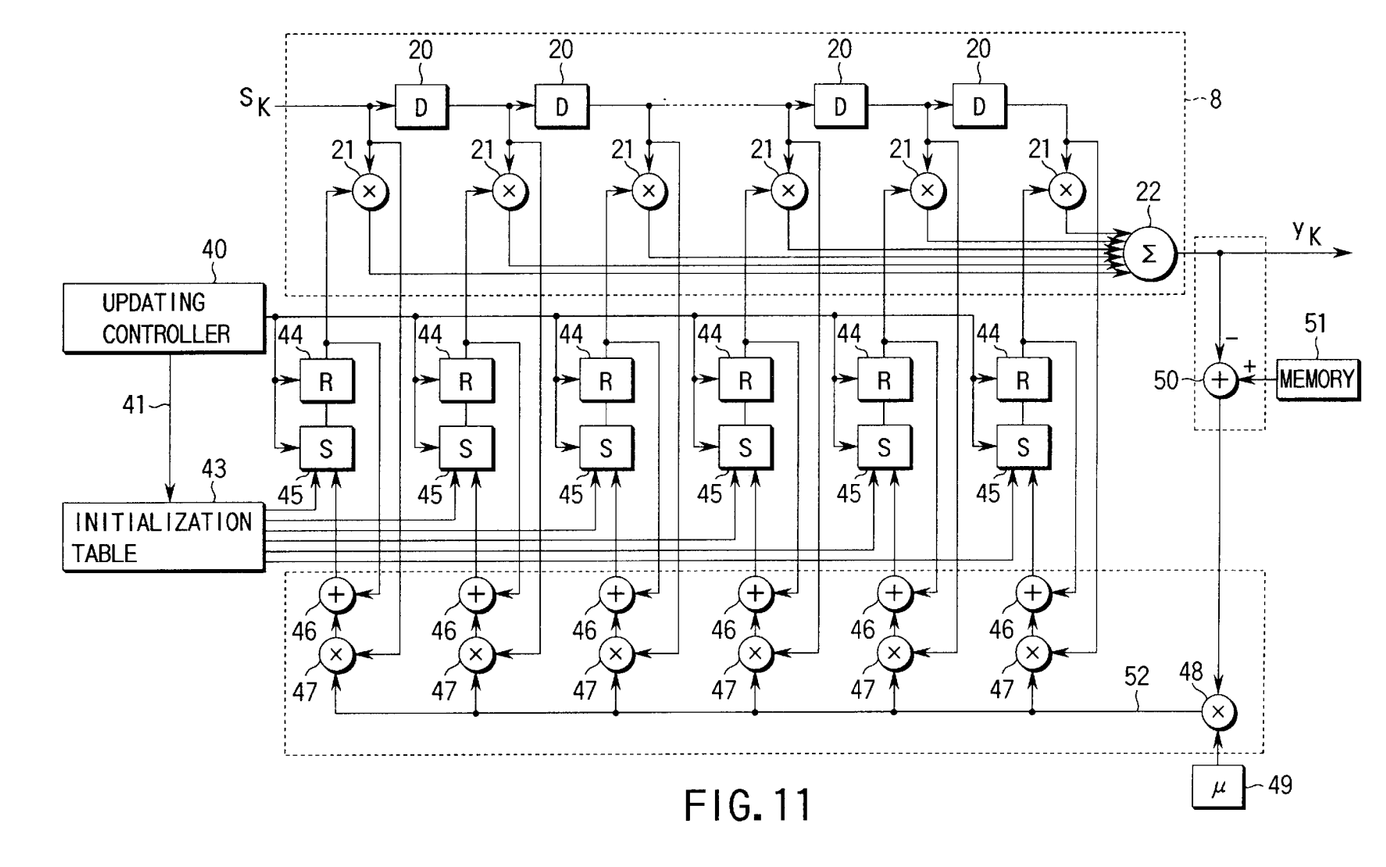
FIG. 11 is a schematic circuit diagram of a linear waveform equalizer obtained modifying the linear waveform equalizer of FIG. 6.

FIG. 11 is a schematic circuit diagram of a linear equalizer obtained by modifying the linear equalizer 8 of the first embodiment. This modified embodiment additionally comprises a circuit for adaptively controlling the tap factor of the linear equalizer 8 of the first embodiment. This circuit is used to make the tap factor of the linear equalizer 8 accommodate any discrepancy between the designed value and the actual value for the reproduced signal waveform that is attributable to the data reading position (track position) on the disk 1 and/or the change with time in the performance of the optical pick-up 3.

Normally, in a disk memory device comprising an adaptive linear equalizer, a predetermined signal waveform pattern that is referred to as training sequence is recorded on a specific position of the disk 1. The adaptive control circuit of this first modified embodiment calculates a tap factor adapted to the reproduced signal corresponding to the training sequence and executes a predetermined operation to update the initial value.

Now, the operation of this first modified embodiment will be described by referring to FIG. 11.

The initialization table 43 stores initial values of tap factor in advance. The updating controller 40 so controls the selectors 45 by way of the signal line 42 that the output of the initialization table 43 provides an input to each of the data registers 44. At the same time, the updating controller 40 so controls the initialization table 43 by way of the control line 41 as to make it output an initial value of tap factor that corresponds to the reading position of the optical pick-up 3 at that time and load it in the registers 44.

Then, when a reproduced signal corresponding to the training sequence is read out of the disk 1, the updating controller 40 controls the selectors 45 so as to make each of them switch the input of the corresponding data register 44 to the output of the corresponding adder 46. The data registers 44 update the tap factors they hold in synchronism with the data clock.

The subtracter 50 calculates the equalization error by subtracting the equalization output $Y_k$ of the linear equalizer 8 from the target equalization sample value stored in the memory 51 in advance. The memory 51 outputs the target equalization sample value it stores in synchronism with the data clock. Then, the equalization error is multiplied by $\mu$ of equation (1) above (stored in the memory 49) by means of the multiplier 48 for updating the tap factor and the product of the multiplication is sent to the multiplier 47, which multiplier 47 then multiplies one by one the values of the sequence $S_k$ ($S_{n,k}$) of the input signal samples of the taps and the product of the multiplication is sent to the adder 46. Then, the adder adds the current tap factor (initial value) to the product of the multiplication and produces the sum as output. Thus, each of the registers 44 is loaded with a tap factor obtained by updating the initial value according to the training sequence. When the reproducing operation of the training sequence is over, the updating controller 40 causes the registers 44 to hold the respective tap factors they have as the results of the most recent updating operation.

Thus, with the above described first modified embodiment, a training sequence may be recorded on the disk 1 each time when a predetermined time period has elapsed in order to update the tap factor of the linear equalizer 8 in a manner as described above in accordance with the operation of reproducing the training sequence.

Therefore, with this modified embodiment, a tap factor that is optimally adapted to the change with time in the performance of the optical pick-up 3 and/or the data reading position (track position) on the disk 1 can be obtained to optimally carry out the operation of linear equalization by means of the linear equalizer 8.

Now, a second possible modification that can be made to the above embodiment will be described.

Figure 12:
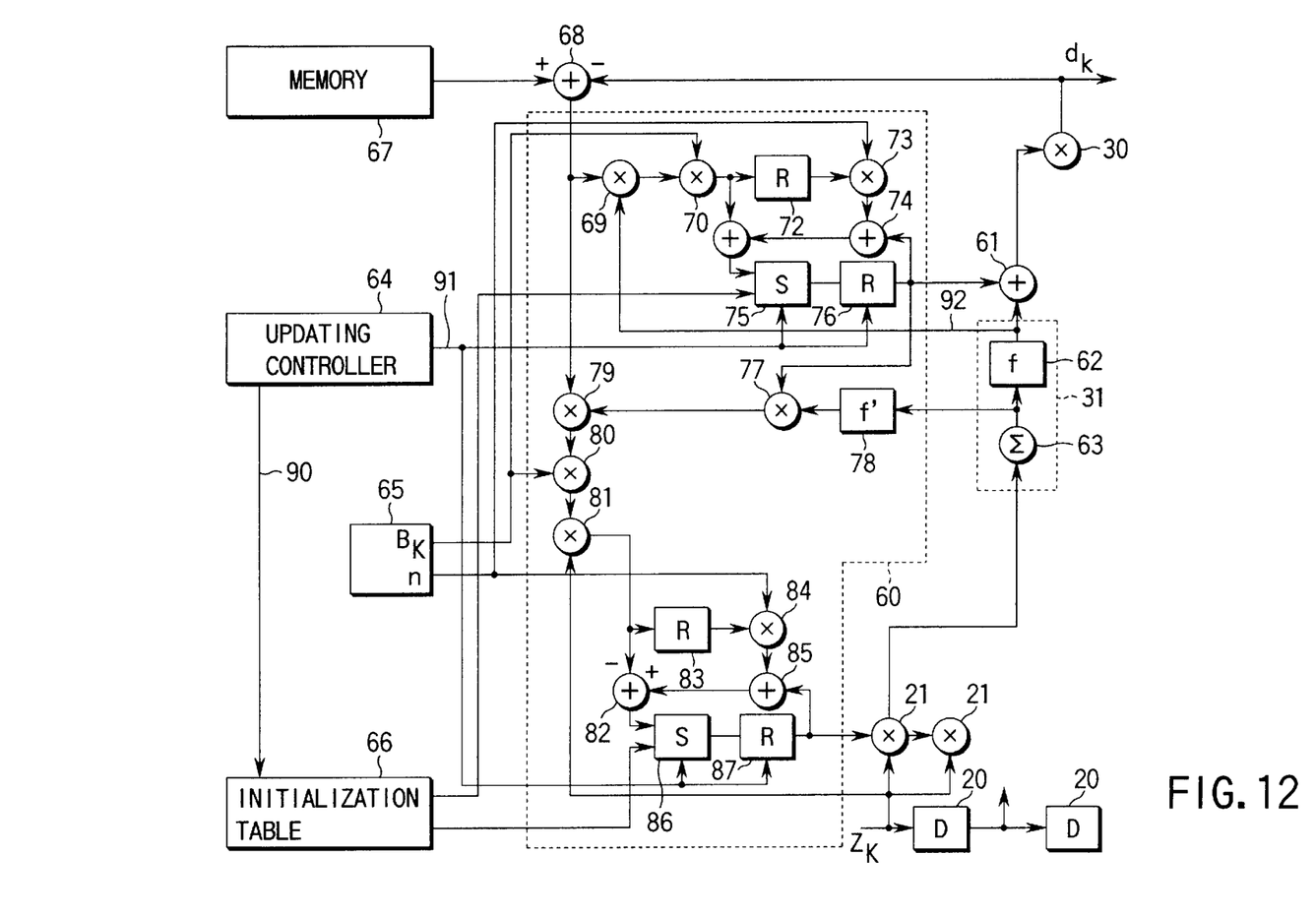
FIG. 12 is a schematic circuit diagram of a nonlinear waveform equalizer obtained by modifying the nonlinear waveform equalizer of FIG. 6.

FIG. 12 is a schematic circuit diagram of a nonlinear equalizer obtained by modifying the nonlinear equalizer 8 of the first embodiment. This modified embodiment additionally comprises a circuit for adaptively controlling the weight of the neural network type nonlinear equalizer 9 of the first embodiment. As in the case of the linear equalizer 8 of the above described first modified embodiment designed for the tap factor, the equalizer 9 of this embodiment is used to make the nonlinear equalizer accommodate any discrepancy between the designed value and the actual value for the reproduced signal waveform that is attributable to the data reading position (track position) on the disk 1 and/or the change with time in the performance of the optical pick-up 3.

Note that only the delay circuits 20 is partly shown in FIG. 12, which also illustrates the intermediate node 31 only in terms of how it is coupled to the output node 30. All the remaining components are omitted therefrom.

Now, the operation of this second modified embodiment will be described by referring to FIG. 12.

As in the case of the first modified embodiment, a predetermined signal waveform pattern that is referred to as training sequence is recorded on a specific position of the disk 1 and a connection weight adapted to the reproduced signal corresponding to the training sequence is determined by calculation in order to carry out an operation of updating the initial value.

The initialization table 66 stores initial values of connection weight in advance. The updating controller 64 so controls the selectors 75 and 86 of the updating circuit 60 by way of the control line 91 that the output of the initialization table 66 provides an input to each of the data registers 76 and 87. At the same time, the updating controller 64 so controls the initialization table 66 by way of the control line 90 as to make it output an initial value of the connection weight that corresponds to the reading position of the optical pick-up 3 at that time and load it in the registers 76 and 87.

Then, when a reproduced signal corresponding to the training sequence is read out of the disk 1, the updating controller 64 controls the selectors 75 and 86 so as to make them switch the inputs of the data registers 76 and 87 to the respective outputs of the corresponding adders 71 and 82. The data registers 76 and 87 update the connection weights they hold in synchronism with the data clock.

The subtracter 68 calculates the equalization error $\delta_k$ by subtracting the equalization output dk of the nonlinear equalizer 9 from the target equalization sample value stored in the memory 67 in advance. The memory 67 outputs the target equalization sample value it stores in synchronism with the data clock. Then, subtracter 68 outputs the equalization error $\delta_k$ to the multipliers 69 and 79 in order to update the connection weights of the intermediate node 31 and the output node 30. The multiplier 69 multiplies the product of multiplication by the value of $\beta_k$ of equation (7) (stored in the memory 65) and produces the new product to the adder 71. The output of the multiplier 70 is equal to $\delta W_{j,k}$ of equation (7) above and stored in the data register 72 in synchronism with the data clock.

On the other hand, the multiplier 73 multiplies the output of the data register 72 by the value of $\eta$ of equation (9) (stored in the memory 65) and produces the produces the product to the adder 74, which adder 74 then adds the current connection weight $W_{j,k}$ of the intermediate node 31 and the output node 30 and the product of multiplication produced by the multiplier 73 and produces the sum to the adder 71. The adder 71 then adds the output $\delta W_{j,k}$ of the multiplier 70 to the sum to determine an updated connection weight $W_{j,k+1}$ of the intermediate node 31 and the output node 30 (see equation (9) above). The selection circuit 75 produces the output of the adder 71 to the register 76. Then, the connection weight $W_{j,k+1}$ that is updated from the initial value according to the training sequence is loaded in the register 76 in synchronism with the data clock.

The intermediate node 31 comprises an adder 63 for calculating the sum of the inputs and a circuit 62 for realizing the function f expressed by formula (3) above. The adder 63 outputs the sum to the circuit 78 for realizing obtaining a derivative of the function f of formula (3) of the updating circuit 60. The multiplier 77 multiplies the output (initial value $W_{j,k}$) of the register 76 by the output of the circuit 78 and produces the product of multiplication to the multiplier 79, which multiplier 79 then multiplies the outcome of the multiplier 77 by the equalization error $\delta_k$ to determine the value of $\delta_{j,k}$ of equation (6) above.

The multipliers 80 and 81 are used to obtain equation (8) above. The multiplier 81 outputs the product $\delta W_{i,j,k}$, which product $\delta W_{i,j,k}$ is then stored in the register 83 in synchronism with the data clock. Additionally, the multiplier 84 multiplies the output of the register 83 by the value of $\eta$ of equation (10) (stored in the memory 65) and produces the product to the adder 85, which adder 85 then adds the output (initial value $W_{i,j,k}$) of the register 87 to the product of multiplication of the multiplier 84. The adder 82 adds the output $\delta W_{i,j,k}$ thereto to produce an updated connection weight $W_{i,j,k+1}$ of the delay circuit 20 and the intermediate node 31 obtained by means of equation (10) above. The updated connection weight $\delta W_{i,j,k}$ is selected by the selector 86 and loaded in the data register 87 in synchronism with the next data clock.

When the reproducing operation of the training sequence is terminated, the updating controller 67 causes the registers 76 and 87 to maintain the respective connection weights they hold as the most recent values.

Thus, with the above described second modified embodiment, the training sequence is recorded on the disk 1 each time when a predetermined time period has elapsed and the weight to be used for the nonlinear equalizer 9 is updated according to the operation of reproducing the recorded training sequence. Therefore, with this modified embodiment, a connection weight that is optimally adapted to the change with time in the performance of the optical pick-up 3 and/or the data reading position (track position) on the disk 1 can be obtained to optimally carry out the operation of nonlinear equalization by means of the nonlinear equalizer 9.

As described above in detail, according to the invention, a disk storage device such as an optical disk device can effectively carry out a linear equalizing operation and, at the same time, a nonlinear equalizing operation of eliminating the adverse effect of nonlinear components of distortions by means of a neural network type nonlinear waveform equalizer on a reproduced signal waveform containing both linear components and non-linear components of distortions that are given rise to as a result of a high recording density. Consequently, data can be restored from reproduced signals with a data detection error ratio held under a permissible level if signals are recorded with a high recording density.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A disk storage device for detecting data from a reproduced signal read from a disk and decoding the data, the device comprising:

an A/D converter for sampling a waveform of the reproduced signal at a predetermined clock cycle and converting the reproduced signal into a digital signal;

a linear equalizer for carrying out a linear waveform equalizing operation on the digital signal converted by the A/D converter in order to reduce a mean square error between the digital signal and an amplitude of an equalization target waveform; and a nonlinear equalizer for carrying out a feedforward neural network type nonlinear waveform equalizing operation on sampled values of a waveform of the digital signal linearly equalized by the linear equalizer.

2. A disk storage device according to claim 1, wherein the nonlinear equalizer comprises a multilayer perceptron type neural network including an input layer having a plurality of delay elements connected in series, a hidden layer having a plurality of intermediate nodes which are not connected to each other, and an output layer having an output node, each of the delay elements has a delay time corresponding to a data clock cycle;

wherein each of the intermediate nodes is supplied with a value calculated by multiplying an input value to the input layer by a connection weight and is supplied with values calculated by multiplying output values from the plurality of delay elements by connection weights respectively, the connection weights used at the multiplying are provided according to each of the values to be supplied to the intermediate nodes, each of the intermediate nodes outputs a value of a nonlinear function according to the supplied values;

wherein the value of the nonlinear function output from each of the intermediate nodes is multiplied by a connection weight; and wherein the output node inputs the multiplied values of the nonlinear function from the plurality of the intermediate nodes and outputs a sum of the multiplied values of the nonlinear function or a value of a nonlinear function corresponding to the sum of the multiplied values of the nonlinear function.

3. A disk storage device according to claim 1, wherein the nonlinear equalizer comprises a multilayer perceptron type neural network including an input layer having delay lines, a hidden layer having a plurality of intermediate nodes which are not connected to each other, and an output node; and wherein connection weights provided between the input layer and the plurality of intermediate nodes and between the plurality of intermediate nodes and the output node are set by carrying out a learning operation on the neural network such that the neural network outputs the equalization target waveform when the sampled values of the signal waveform equalized by the linear equalizer are input.

4. A disk storage device according to claim 1, wherein the linear equalizer includes a transversal filter comprising a plurality of delay elements connected in series, a plurality of multipliers for multiplying outputs of the delay elements by a factor and an adder for adding outputs from the multipliers, each of the plurality of delay elements has a delay time corresponding to the data clock cycle; and wherein the factor is provided by a least mean square algorithm so as to obtain a final equalization target when a reproduced waveform is input to the linear equalizer.

5. A disk storage device according to claim 1, further comprising:

means for generating a target equalization sample value of the reproduced signal waveform;

means for calculating an error between an output of the linear equalizer and the target equalization sample value;

means for generating an updating control coefficient to control an updating characteristic;

means for providing an initial value of a tap factor to the linear equalizer;

means for generating a new tap factor to the linear equalizer in accordance with the tap factor of the linear equalizer, the error, the updating control coefficient and a current tap factor; and control means for validating of invalidating the updating function for updating the tap;

wherein the control means validates the updating function for reproducing a sequence of reproduced signal waveforms corresponding to a sequence of sampled values for generating the target equalization sample value, switches to the new tap factor after initializing the tap factor and invalidates the updating function when the reproduction of the sequence of reproduced signal waveforms is completed; and wherein the linear equalizer carries out a linear equalization process by means of the new tap factor after the updating function is invalidated.

6. A disk storage device according to claim 2, further comprising:

means for generating a target equalization sample value of the reproduced signal waveform;

means for calculating an error between an output of the nonlinear equalizer and the target equalization sample value;

means for providing an initial value of a tap factor to the nonlinear equalizer;

means for generating a new connection weight for the nonlinear equalizer in accordance with an input value of the nonlinear equalizer and the output values of the plurality of delay elements, the error, a sum of inputs of the plurality of intermediate nodes constituting the nonlinear equalizer, outputs of the intermediate nodes and a current connection weight; and control means for validating or invalidating the function of updating the connection weight;

wherein the control means validates the updating function for reproducing a sequence of reproduced signal waveforms corresponding to a sequence of sampled values for generating the target equalization sample value, switches to the connection weight after initializing the connection weight and invalidates the updating function when the reproduction of the sequence of reproduced signal waveforms is completed; and wherein the nonlinear equalizer carries out a nonlinear equalization process using the updated connection weight after the updating function is invalidated.

7. A waveform equalizer adapted to a memory device for detecting data out of a reproduced signal read from a disk and decoding the data, the waveform equalizer equalizing a digital signal waveform corresponding to the reproduced signal waveform into a waveform optimally adapted to a data detecting operation, the waveform equalizer comprising:

a linear equalizer for carrying out a linear waveform equalizing operation on the digital signal waveform to reduce a mean square error relative to an amplitude of an equalization target waveform; and    a nonlinear equalizer for carrying out a feedforward neural network type nonlinear waveform equalizing operation on sampled values of the waveform of the digital signal linearly equalized by the linear equalizer.

8. A waveform equalizer according to claim 7, wherein the nonlinear equalizer comprises a multilayer perceptron type neural network including an input layer having a plurality of delay elements connected in series, a hidden layer having a plurality of intermediate nodes and an output layer having an output node, each of the delay elements has a delay time corresponding to a data clock cycle;

wherein each of the intermediate nodes is supplied with a value calculated by multiplying an input value to the input layer by a connection weight and is supplied with values calculated by multiplying output values from the plurality of delay elements by connection weights respectively, the connection weights used at the multiplying are provided according to each of the values to be supplied to the intermediate modes, each of the intermediate nodes outputs a value of a nonlinear function according to the supplied values;

wherein the value of the nonlinear function output from each of the intermediate nodes is multiplied by a connection weight; and    wherein the output node inputs the multiplied values of the nonlinear function from the plurality of the intermediate nodes and outputs a sum of the multiplied values of the nonlinear function or a value of a nonlinear function corresponding to the sum of the multiplied values of the nonlinear function.

9. A waveform equalizer according to claim 7, wherein the nonlinear equalizer comprises a multilayer perceptron type neural network including an input layer having delay lines, a hidden layer having a plurality of intermediate nodes which are not connected to each other, an output node; and    wherein connection weights provided between the input layer and the plurality of intermediate nodes and between the plurality of intermediate nodes and the output node are set by carrying out a learning operation on the neural network such that the neural network outputs the equalization target waveform when the sampled values of the signal waveform equalized by the linear equalizer are input.

10. A waveform equalizer according to claim 7, wherein the linear equalizer includes a transversal filter comprising a plurality of delay elements connected in series, multipliers for multiplying outputs of the delay elements by a factor and an adder for adding outputs of the multipliers, each of delay elements has a delay time corresponding to a data clock cycle;

wherein the factor is provided by a least mean square algorithm so as to obtain a final equalization target when a reproduced waveform is input to the linear equalizer.

11. A waveform equalizer according to claim 7, further comprising:

means for generating a target equalization sample value of the reproduced signal waveform;

means for calculating an error between an output of the linear equalizer and the target equalization sample value;

means for generating an updating control coefficient to control an updating characteristic;

means for providing an initial value of a tap factor to the linear equalizer;

means for generating a new tap factor for the linear equalizer in accordance with the tap factor of the linear equalizer, the error, the updating control coefficient and a current tap factor; and    control means for validating or invalidating the updating function for updating the tap factor;

wherein the control means validates the updating function for reproducing a sequence of reproduced signal waveforms corresponding to a sequence of sampled values for generating the target equalization sample value, switches to the new tap factor after initializing the tap factor and invalidates the updating function when the reproduction of the sequence of reproduced signal waveforms is completed; and    wherein the linear equalizer carries out a linear equalization process by means of the new tap factor after the updating function is invalidated.

12. A waveform equalizer according to claim 8, further comprising:

means for generating a target equalization sample value of the reproduced signal waveform;

means for calculating an error between an output of the nonlinear equalizer and the target equalization sample value;

means for providing an initial value of a tap factor to the nonlinear equalizer;

means for generating a new connection weight for the nonlinear equalizer in accordance with an input value of the nonlinear equalizer and the output values of the plurality of delay elements, the error, a sum of the inputs of the plurality of intermediate nodes constituting the nonlinear equalizer, the outputs of the intermediate nodes and a current connection weight; and    control means for validating or invalidating the function of updating the connection weight,    wherein the control means validates the updating function for reproducing a sequence of reproduced signal waveforms corresponding to a sequence of sampled values for generating the target equalization sample value, switches to the connection weight after initializing the connection weight and invalidates the updating function when the reproduction of the sequence of reproduced signal waveforms is completed; and    wherein the nonlinear equalizer carries out a nonlinear equalization process using the updated connection weight after the updating function is invalidated.

13. A disk storage device according to claim 1, wherein the nonlinear equalizer does not include a detector and a feedback loop.

14. A waveform equalizer according to claim 7, wherein the nonlinear equalizer does not include a detector and a feedback loop.

* * * * *